United States Patent
Jiang et al.

(10) Patent No.: US 9,304,634 B2
(45) Date of Patent: Apr. 5, 2016

(54) TOUCH PANEL AND FABRICATION METHOD THEREOF

(71) Applicants: Yau-Chen Jiang, Zhubei (TW); Jia Wu, Xiamen (CN); Zhixiong Cai, Longhai (CN); Pingping Huang, Sanming (CN)

(72) Inventors: Yau-Chen Jiang, Zhubei (TW); Jia Wu, Xiamen (CN); Zhixiong Cai, Longhai (CN); Pingping Huang, Sanming (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 624 days.

(21) Appl. No.: 13/723,145

(22) Filed: Dec. 20, 2012

(65) Prior Publication Data

US 2014/0174789 A1    Jun. 26, 2014

(51) Int. Cl.
*G06F 3/044* (2006.01)
(52) U.S. Cl.
CPC ...... *G06F 3/044* (2013.01); *G06F 2203/04103* (2013.01); *G06F 2203/04111* (2013.01)
(58) Field of Classification Search
CPC ..................................................... G06F 3/044
See application file for complete search history.

(56) References Cited

U.S. PATENT DOCUMENTS 8,994,668 B2 * 3/2015 Yoshiyama .................. 345/173

FOREIGN PATENT DOCUMENTS

TW    M388043    9/2010

* cited by examiner

*Primary Examiner* — Evan Pert
(74) *Attorney, Agent, or Firm* — Gokalp Bayramoglu

(57) ABSTRACT

The present disclosure relates to a touch panel, and more particularly, to a kind of touch panel which actualizes various touch response functions on a same surface and a fabrication method thereof. The touch panel includes an upper cover substrate, a first electrode array, a patterned mask layer, and at least a second electrode array. The upper cover substrate includes a display area and a peripheral area surrounding the display area. The first electrode array is disposed corresponding to the display area. The patterned mask layer is disposed corresponding to the peripheral area. At least a second electrode array is disposed corresponding to a first patterned area of the patterned mask layer. A fabricating method for the touch panel is also provided.

20 Claims, 8 Drawing Sheets

TOUCH PANEL AND FABRICATION METHOD THEREOF

BACKGROUND OF THE INVENTION

This Application claims the benefit of the People's Republic of China Application No. 201110455694.4, filed on Dec. 25, 2011.

FIELD OF THE INVENTION

The present disclosure relates to a touch technique, and more particularly to a touch panel and a fabrication method thereof.

DESCRIPTION OF THE RELATED ART

In the current market for various consumer electronics, touch panels are widely used as a human interface in the portable electronics such as personal digital assistant, mobile phone, notebook, and tablet PC. Moreover, as the current design of electronics is oriented towards being light-weight, thin, brief, and compact, there exists insufficient space in products for containing traditional input devices such as keyboard, mouse etc., and especially under the driving impact of the need for tablet PCs, touch panels have become one of the key components.

The area of the current touch panel can roughly be divided into the display region and the surrounding shielding region, wherein touch input function is devised in the display area for sensing the user's touch input and pressing input is devised in the surrounding shielding region by adopting a physical button. However, the traditional physical button can only be used by designing through holes on the surface of the touch panel, which leads to relatively undesirable appearance effect, inferior reliability, and uneasy cleaning of touch panels. Moreover, the physical button requires another step of assembling, and therefore the fabrication process is complex.

SUMMARY OF THE INVENTION

The present disclosure is to provide a touch panel and a fabrication method thereof, which actualizes various touch response functions on the same surface through a framework design of the touch panel and adjustment of structural arrangement of electrode arrays without using physical bottom to improve the problems of the physical bottom abovementioned.

The disclosure provides a touch panel comprising an upper cover substrate, a first electrode array, a patterned mask layer, and at least a second electrode array, wherein the upper cover substrate comprises a display region and a peripheral region, which surrounds the display region. The first electrode array is disposed corresponding to the display region, and the patterned mask layer is disposed corresponding to the peripheral region. At least one second electrode array is disposed corresponding to a first patterned region of the patterned mask layer.

The disclosure provides a fabrication method of a touch panel. A patterned mask layer is first formed so as to be disposed corresponding to a peripheral region of an upper cover substrate, which surrounds a display region of the upper cover substrate. Next, a first electrode array and a second electrode array are formed, wherein the first electrode array is disposed corresponding to the display region and the second electrode array is disposed corresponding to a first patterned region of the patterned mask layer.

The touch panel and the fabrication method of the touch panel, provided in the present disclosure, include disposing electrode arrays corresponding to both the display region and the peripheral region of touch panel so as to possess their respective touch response functions. Therefore, there is no need of any through holes designed on the surface of the touch panel to keep the evenness of the touch panel appearance with easy cleaning. Moreover, the electrode arrays used for actualizing various touch response functions can be finished in the same step of manufacturing process to empower the touch panel in this disclosure with more reliability and simplicity.

BRIEF DESCRIPTION OF THE DRAWINGS

For those skilled in the art, numerous embodiments and drawings described below are for illustration purpose only and do not limit the scope of the present disclosure in any manner.

DETAILED DESCRIPTION OF THE EMBODIMENTS

Figure 1:
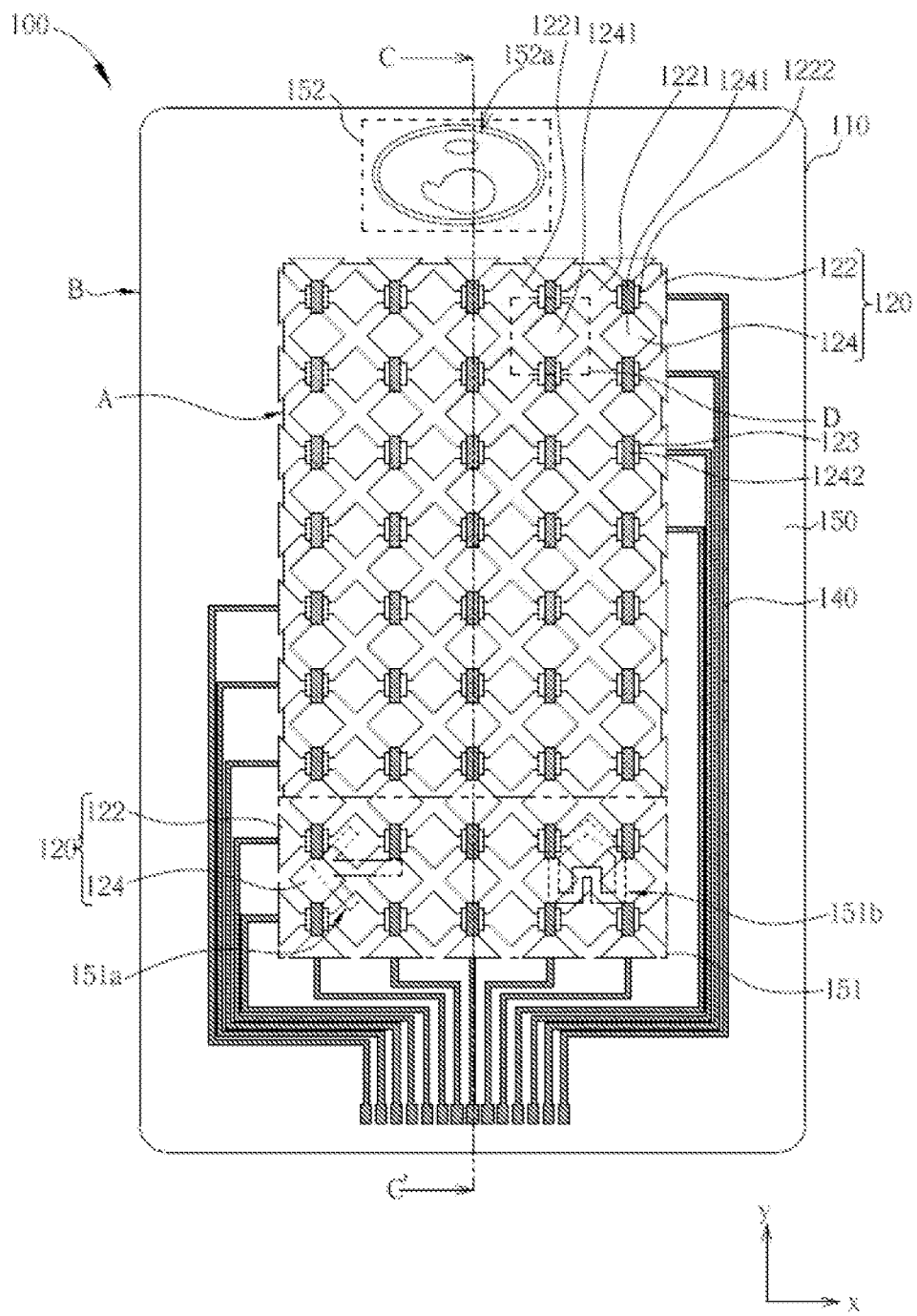
FIG. 1 shows top view of a touch panel in accordance with an embodiment of the present disclosure.

FIG. 1 shows top view of a touch panel in accordance with an embodiment of the present disclosure, wherein the touch panel 100 can be applied to electronic devices with screen display function such as computer, mobile phone, acoustic equipment and vehicle-used apparatus. The touch panel 100 in the present embodiment is illustrated from an overlooking angle of the reverse side, which is also described as the untouched surface for the user when the touch panel 100 is made into use. As shown in FIG. 1, the touch panel 100 comprises an upper cover substrate 110, a first electrode array 120, at least one second electrode array 120', and a patterned mask layer 150.

The upper cover substrate 110 comprises a display region A and a peripheral region B, wherein the peripheral region B surrounds the display region A. Specifically, the screen visible area of the foregoing electronic device is one that is disposed on the display region A, while the patterned mask layer 150 is disposed corresponding to the peripheral region B for providing shielding and concealing effects in the periphery of the display region A. The patterned mask layer 150 in the present embodiment can be made of opaque (such as black) materials by printing or coating. Moreover, the patterned mask layer 150 further comprises a first patterned region 151 in which at least one piercing pattern 151a and 151b are designed. The present embodiment is to design the piercing patterns of button symbols related to return key and home page key, wherein the forms and the number of piercing patterns designed are not limited by this, and can contain symbols of other buttons such as menu key, switch key etc., in accordance with actual demand of function design.

The first electrode array 120 is disposed corresponding to the display region A, which not only serves as a window of viewing screen display, but is also used for providing the touch response function of screen operation. The second electrode array 120' is disposed corresponding to the first patterned region 151 of the patterned mask layer 150, which renders the peripheral region B to provide the touch response function of virtual button operation via the first patterned region 151 of the patterned mask layer 150 and the corresponding second electrode array 120'. This embodiment can actualize various touch response functions on the same surface of the touch panel 100.

In addition, the patterned mask layer 150 in this embodiment further comprises a second patterned region 152 in which at least one piercing pattern 152a with a marked symbol of trademark, stamp or model can be designed to render the peripheral region B further used for providing the display of marked symbols.

Figure 2:
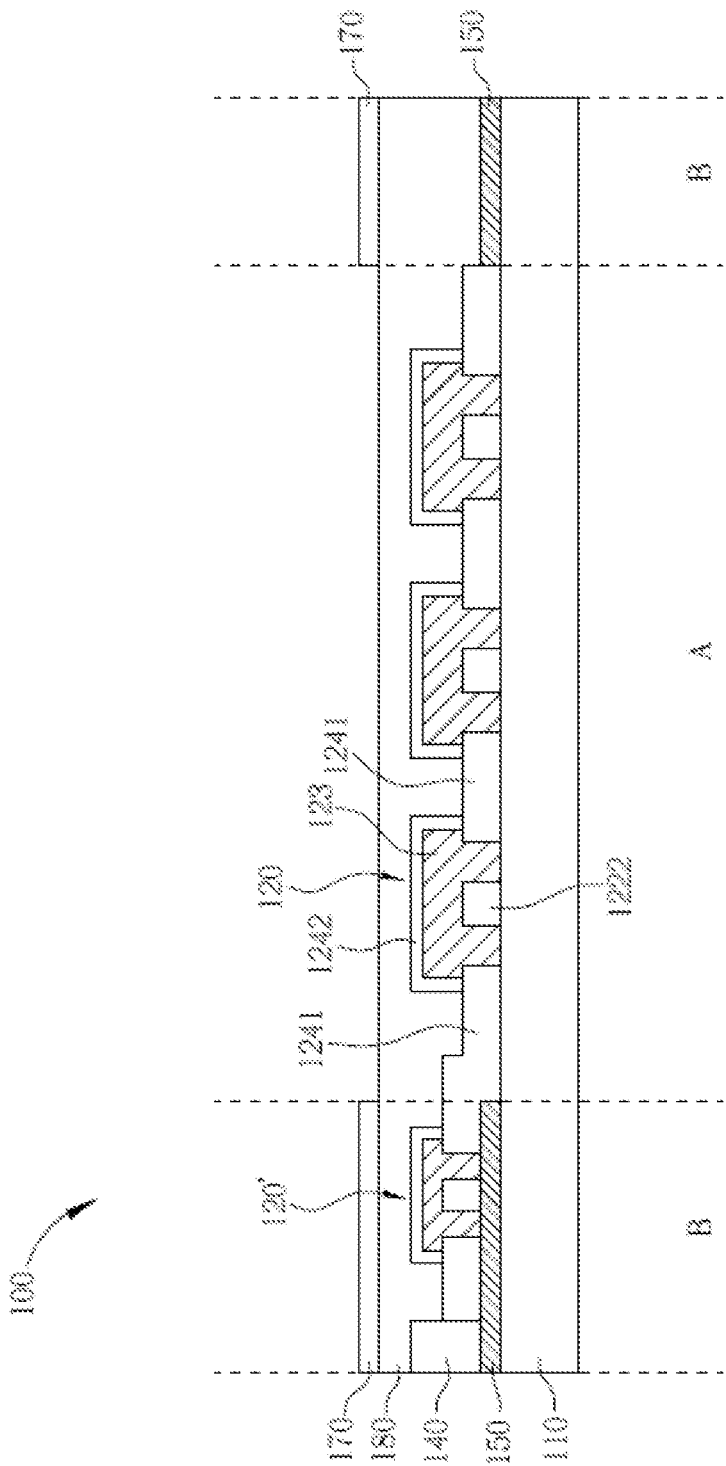
FIG. 2 shows a schematic diagram of cross section C-C' of FIG. 1.

To illustrate the laminated framework of the touch panel 100 of the present embodiment more explicitly, please refer to FIG. 2 as a schematic diagram of cross section C-C' of FIG. 1. The first electrode array 120 and the patterned mask layer 150 of the present embodiment are disposed on the upper cover substrate 110, while the second electrode array 120' is further disposed on the patterned mask layer 150. The upper cover substrate 110 can be adopted with glass and like materials, and subjected to surface treatment such as strengthening, anti-glare and anti-bacteria, because of its applications as a protective substrate as well as a touch substrate.

In actual production, the first electrode array 120 and the second electrode array 120' can be fabricated by the same step of manufacturing procedure to form within a same inductive electrode layer, wherein the first electrode array 120 and the second electrode array 120' respectively contain a plurality of first inducing lines 122 aligned in parallel with a first axis (the X axis in the embodiment) and a plurality of second inducing lines 124 aligned in parallel with a second axis (the Y axis in the embodiment), and the first inducing lines 122 and second inducing lines 124 are mutually insulated.

More explicitly, each first inducing line 122 includes a plurality of first conductive units 1221 and a plurality of first conductive wires 1222. Similarly, each second inducing line 124 includes a plurality of second conductive units 1241 and a plurality of second conductive wires 1242. The first conductive units 1221, the first conductive wires 1222, and the second conductive units 1241 are produced by a conductive layer through photo lithography, in other words, the first conductive units 1221, the first conductive wires 1222, and the second conductive units 1241 are belonged to the conductive layer. The formed first conductive units 1221 are disposed mutually at intervals along the first axis, while the first conductive wire 1222 is electrically connected to two adjacent first conductive units 1221 on the first axis. Areas between the adjacent first inducing lines 122 and surrounded by the adjacent first conductive units 1221 are defined as a configuration region D in which the formed second conductive units 1241 are respectively disposed. The second conductive wires 1242 are further produced by a wiring layer through photo lithography to correspondingly cross the first conductive wires 1222 and in electrical connection between two adjacent second conductive units 1241 on the second axis, in other words, the second conductive wires 1242 is belonged to the wiring layer. Moreover, the inductive electrode layer further includes an insulating layer on which a plurality of insulating blocks 123 are formed to be set correspondingly between the first conductive wire 1222 and the second conductive wire 1242, which results in electrical insulation of the first inducing line 122 and the second inducing line 124. As a result of this, the laminated structure composed of the foregoing conductive layer, the wiring layer, and the insulating layer can construct the inductive electrode layer of the present embodiment.

The foregoing conductive layer can be designed by adopting transparent conductive materials including Indium Tin Oxide (ITO), Indium Zinc Oxide (IZO), Cadmium Tin Oxide (CTO), Aluminum Zinc Oxide (AZO), Indium Tin Zinc Oxide (ITZO), Zinc Oxide, Cadmium Oxide, Hafnium Oxide (HfO), Indium Gallium Zinc Oxide (InGaZnO), Indium Gallium Zinc Magnesium Oxide (InGaZnMgO), Indium Gallium Magnesium Oxide (InGaMgO), Indium Gallium Aluminum Oxide (InGaAlO) and so on, while the second conductive wires 1242 within the wiring layer can be designed by adopting metallic conductive wires (such as silver wire) except for the same materials to conductive layer.

The touch panel 100 of the present embodiment further comprises a lead-wire structure 140 disposed corresponding to peripheral region B and forming an electrical connection to the first electrode array 120 and the second electrode array 120'. The lead-wire structure 140, electrically connected to a controlling unit, (not shown) is used for transmitting the chive signals of the controlling unit as well as the sensing signals of the first electrode array 120 and the second electrode array 120'. In addition, the lead-wire structure 140 of the present embodiment can be produced together through photo lithography when the second conductive wire 1242 is formed as described previously, and also belonged to the wiring layer pertinent to the second conductive wires 1242.

Incidentally, the second electrode array 120' of the present embodiment as designed is electrically connected to the first electrode array 120 so as to serve as an extending part of the first electrode array 120. Therefore, the controlling unit can be designed as a whole with the touch sensing modes of the first electrode array 120 and the second electrode array 120'. The controlling unit of the present embodiment can generate drive signals for transmitting to each first inducing line 122 of the first electrode array 120 and the second electrode array 120' in sequence, and to receive touch sensing signals generally via the second inducing lines 124 of the second electrode array 120' so as to actualize the touch response functions of the first electrode array 120 and the second electrode array 120'.

Moreover, since the first patterned region 151 and the second patterned region 152 of the patterned mask layer 150 in the present embodiment respectively include the piercing patterns 151a, 151b, and 152a, that is since the piercing parts of these patterns belong to patterns having light-penetration, the touch panel 100 of the present embodiment can furthermore contain a colorful film 170, which can be disposed corresponding to the patterned mask layer 150 so that the piercing patterns 151a and 151b of the first patterned region 151 and 152a of the second patterned region 152 may further present color effect. The colorful film 170 can be produced by printing or spraying colorful inks, colorful photoresistances and light-guiding inks, or by attaching to colorful laminated films, and the identical colorful films 170 are not confined to monothromatic state so that the touch panel 100 of the present embodiment can be enriched with more color effects to become aesthetical in appearance, and can create the product specificity in simple requisition of alteration in the colors of the colorful film 170.

At last, the touch panel 100 of the present embodiment further contains a passivation layer 180 which is used for being disposed between the inductive electrode layer described previously and the colorful film 170 and covers the inductive electrode layer entirely to prevent it from being subjected to chemical corrosion or physical damage so as to bring about bad influence on the touch inductive functions.

Figure 3:
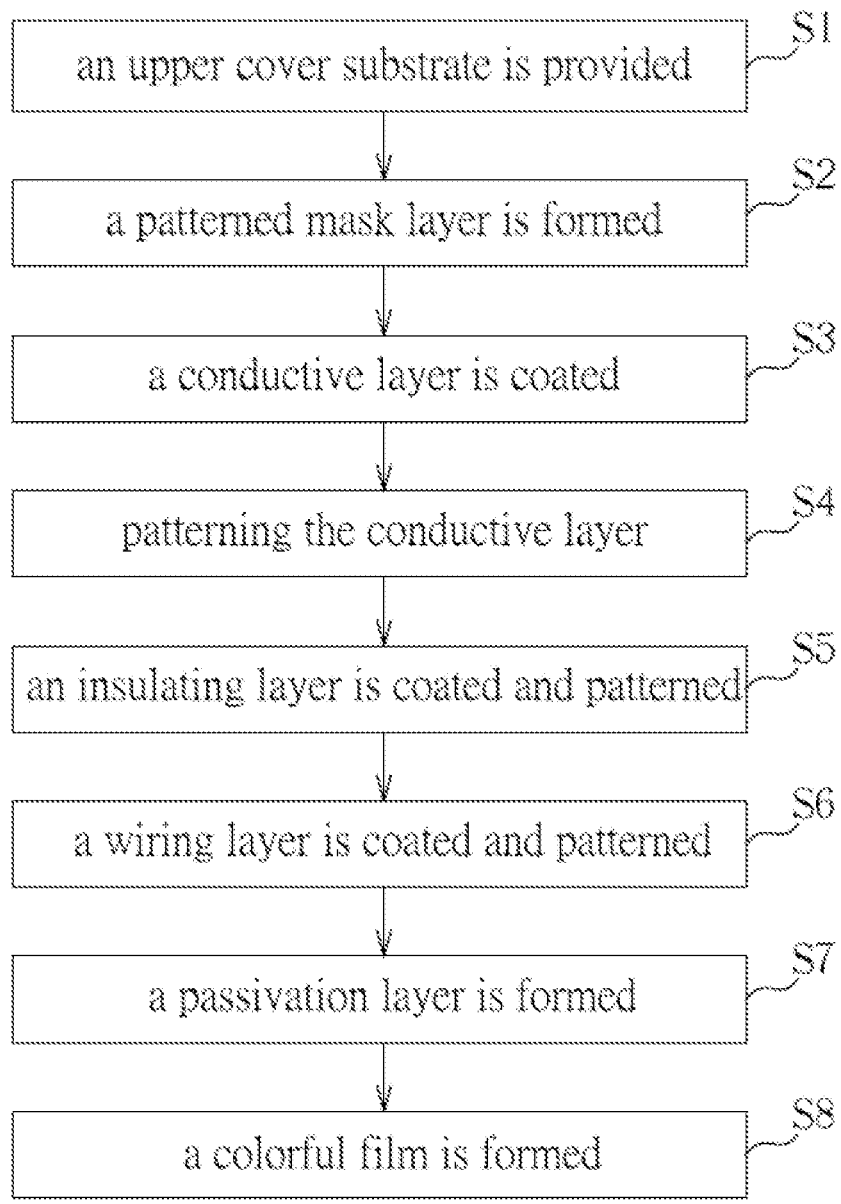
FIG. 3 shows a flow chart of a fabrication method of touch panel in accordance with an embodiment of the present disclosure.

Subsequently, the fabrication procedure of the touch panel 100 in the present disclosure is further illustrated. Based on the cross-sectional framework shown in FIG. 2, please refer to the flow chart of the fabrication method of touch panels in accordance with an embodiment of the present disclosure presented in FIG. 3. To illustrate more explicitly, we can refer to the top-view schematic diagram of the staged structures of touch panel in accordance with an embodiment of the present disclosure presented in FIGS. 4-7.

Figure 4:
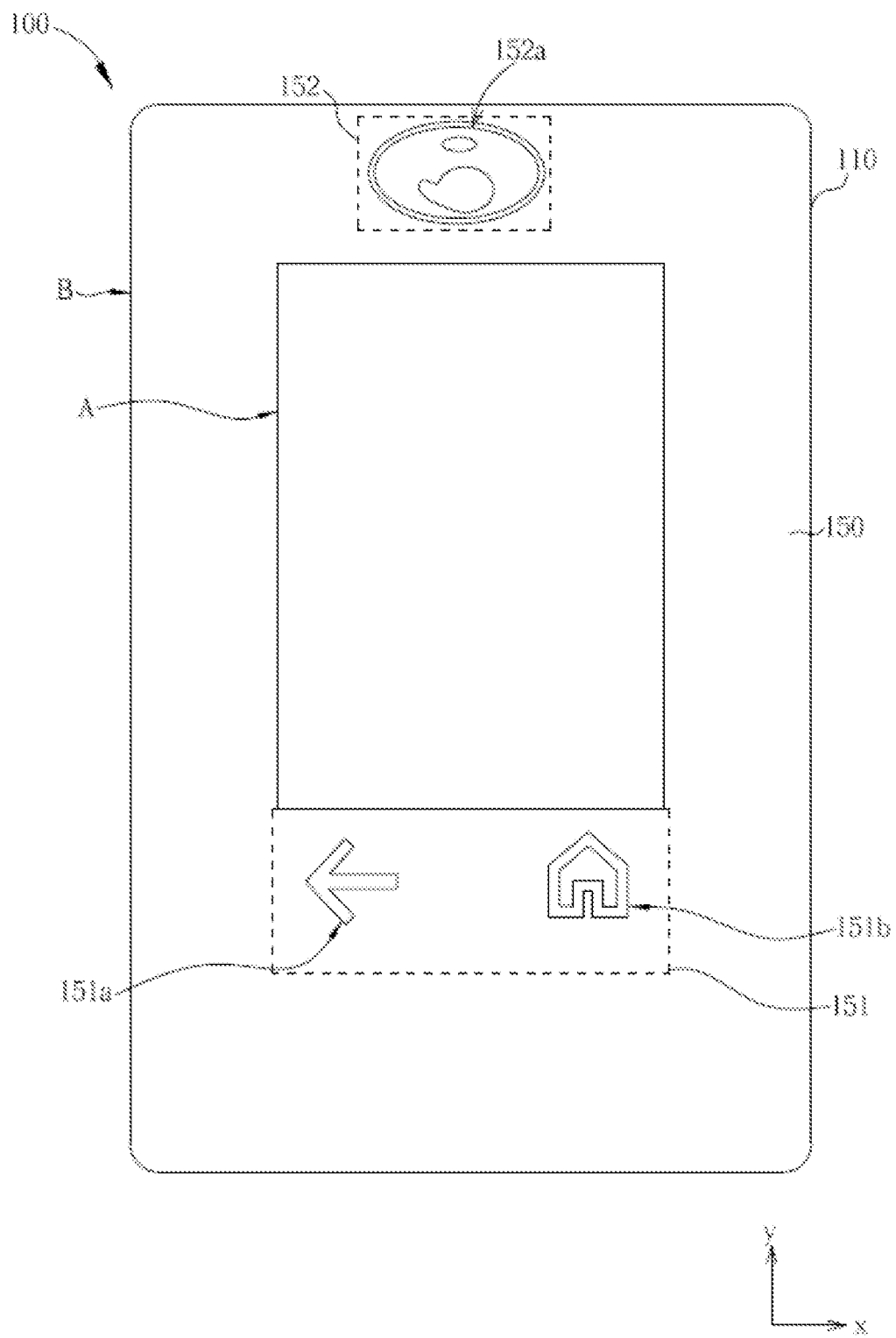
FIGS. 4-7 show a top-view schematic diagram of stage structures related to a touch panel in accordance with an embodiment of the present disclosure.

First of all, an upper cover substrate 110 is provided (Step 1), as shown in FIG. 4. The upper cover substrate 110 is programmed as having, a display region A and a peripheral region B based on the dimension of the display of the electronic device in collocation with the touch panel 100, wherein the peripheral region B usually surrounds the display region A. Next, a patterned mask layer 150 is formed on the upper cover substrate 110 and disposed corresponding to the peripheral region B of upper cover substrate 110 (Step S2). The patterned mask layer 150 can be coated by printing or spraying, and the patterned mask layer 150 of the present embodiment can include a first patterned region 151 and a second patterned region 152. The first patterned region 151 and the second patterned region 152 respectively contain at least one piercing pattern 151a, 151b and 152a, the piercing patterns 151a and 151b in the first patterned region 151 serving as symbols of virtual buttons while the piercing pattern 152a in the second patterned region 152 serving as the symbol of mark.

Figure 5:
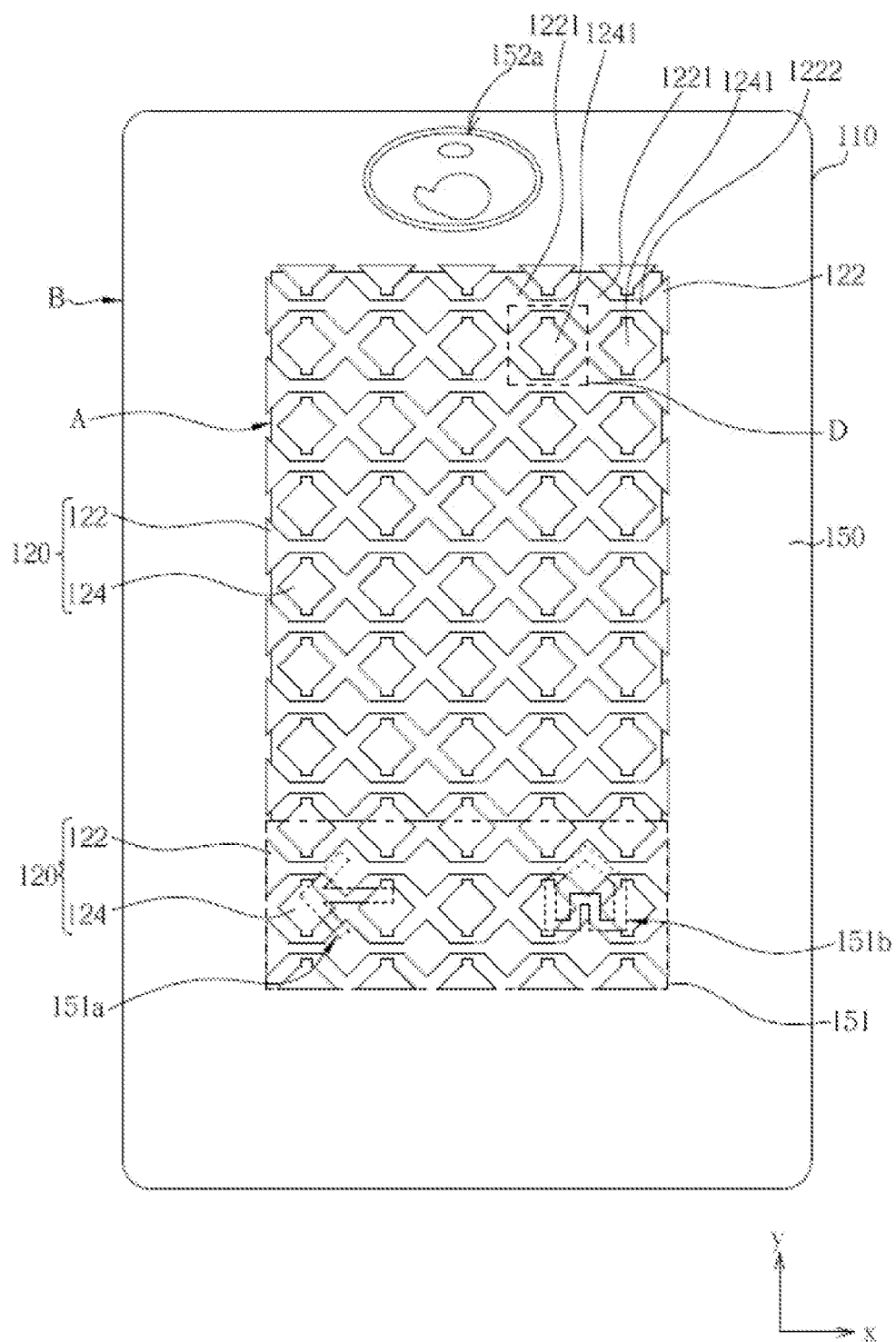

After Step S2, a conductive layer is coated (Step S3) and then patterned (Step S4). As shown in FIG. 5, the conductive layer of the present embodiment is further correspondingly coated on the first patterned region 151 of the patterned mask layer 150 except for the display region A of the upper cover substrate 110. The patterned conductive layer includes a plurality of first inducing lines 122 aligned in parallel with the first axis (the X axis), wherein each first inducing line 122 contains a plurality of first conductive units 1221 and a plurality of first conductive wires 1222. The foregoing conductive units 1221 are disposed at intervals, whereas two adjacent first conductive units 1221 are in electrical connection through the first conductive wire 1222. Moreover, areas between the adjacent first inducing lines 122 and surrounded by the adjacent first conductive units 1221 are respectively defined as configuration area D. In addition, the patterned conductive layer further includes a plurality of second conductive units 1241, which are respectively disposed in the configuration area D formed above.

Figure 6:
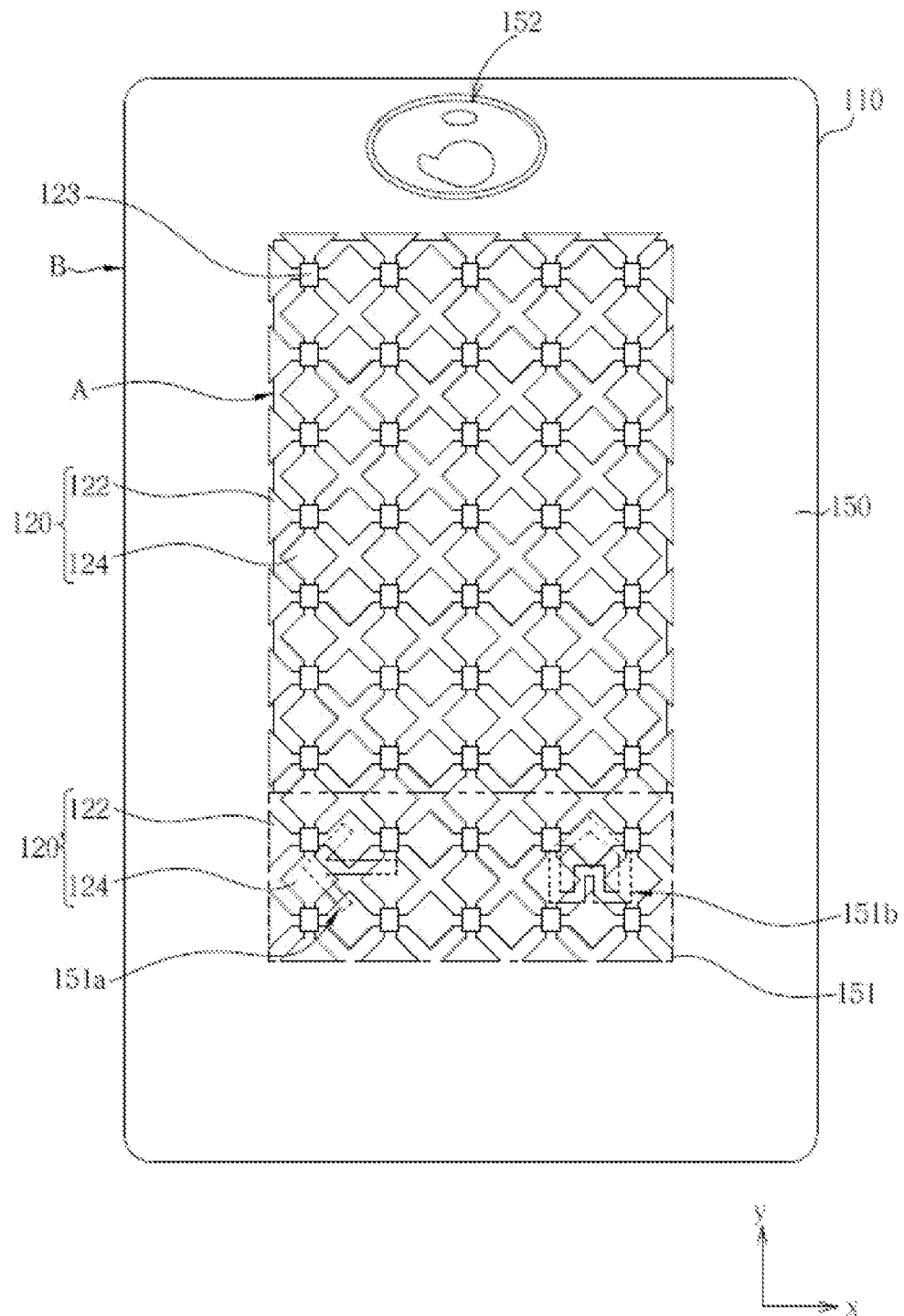
Figure 7:
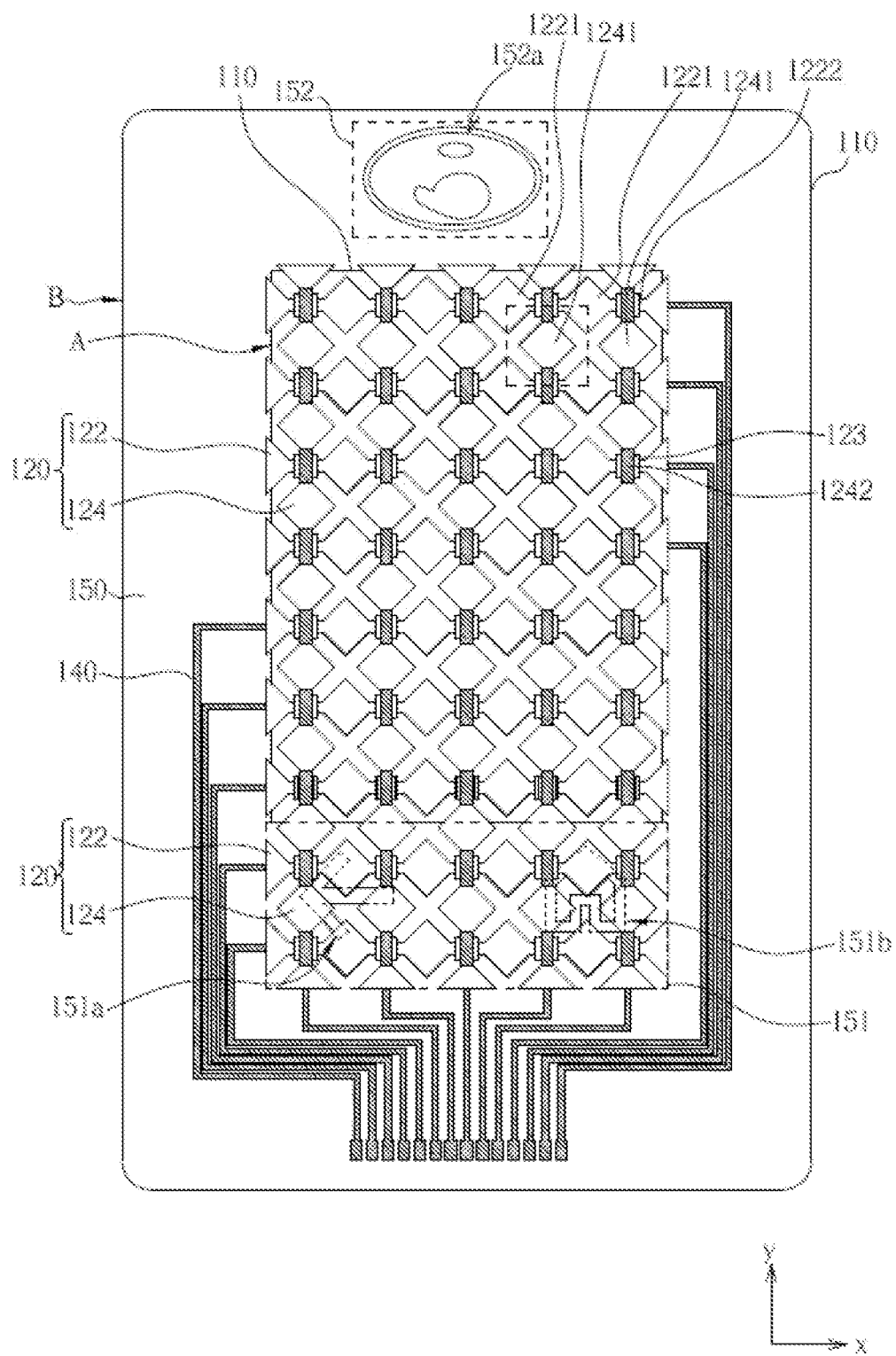

Subsequently, an insulating layer is coated and patterned (Step S5). As shown in FIG. 6, a plurality of insulating blocks 123 are correspondingly formed to dispose on the first conductive wires 1222 during coating and patterning the insulating layer. After Step S5, a wiring layer is coated and patterned (Step S6). In FIG. 7, a plurality of second conductive wires 1242 are correspondingly forged to dispose on the insulating blocks 123 during coating and patterning the wiring Layer. Therefore, the second conductive wires 1242 of the wiring layer can cross the first conductive wires 1222 through the insulating blocks 123 to be in electrical connection between two adjacent second conductive units 1241 along the second axis (the Y axis) respectively, thus proceeding to structure integrally a plurality of second inducing lines 124 aligned in parallel with the second axis. As a result, the inductive electrode layer, composed of the foregoing conductive layer, the insulating layer, and the wiring layer, can form a first electrode array 120 on the display region A of the upper cover substrate 110, and a second electrode array 120' on the patterned mask layer 150.

In addition, in an embodiment of the present disclosure, during coating and patterning the wiring layer in Step S6, a lead-wire structure 140 is further formed to dispose on the patterned mask layer 150 and disposed corresponding to the peripheral region B, and used for electrically connecting to the first electrode array 120 and the second electrode array 120'.

Next, a passivation layer 180 is formed to cover the inductive electrode layer structured previously (Step S7), wherein the passivation layer 180 can be produced by adopting inorganic materials such as silicon nitride, silicon oxide and silicon oxynitride, etc., or by adopting organic materials such as acrylic resin, or other suitable transparent materials.

Finally, a colorful film 170 can be formed on the passivation layer 180 and disposed corresponding to the patterned mask layer 150 (Step S8), wherein the colorful film 170 can be produced by printing or spraying colorful inks, colorful photoresistances and light-guiding inks, and the printing or spraying procedure can further adopt a lane-printing process to render a colorful film 170 having the diversity of color effects. In addition, it would be appreciated that the colorful film 170 in the structure of the touch panel 100 of the present embodiment is only not confined to be disposed on the passivation layer 180. As long as the colorful film 170 can be disposed corresponding to the patterned mask layer 150 to allow viewing from positive side of the touch panel 100, the piercing patterns 151a, 151b of the first patterned region 151 and the piercing pattern 152a of the second patterned region 152 can have color effects by means of the colorful film 170.

Figure 8:
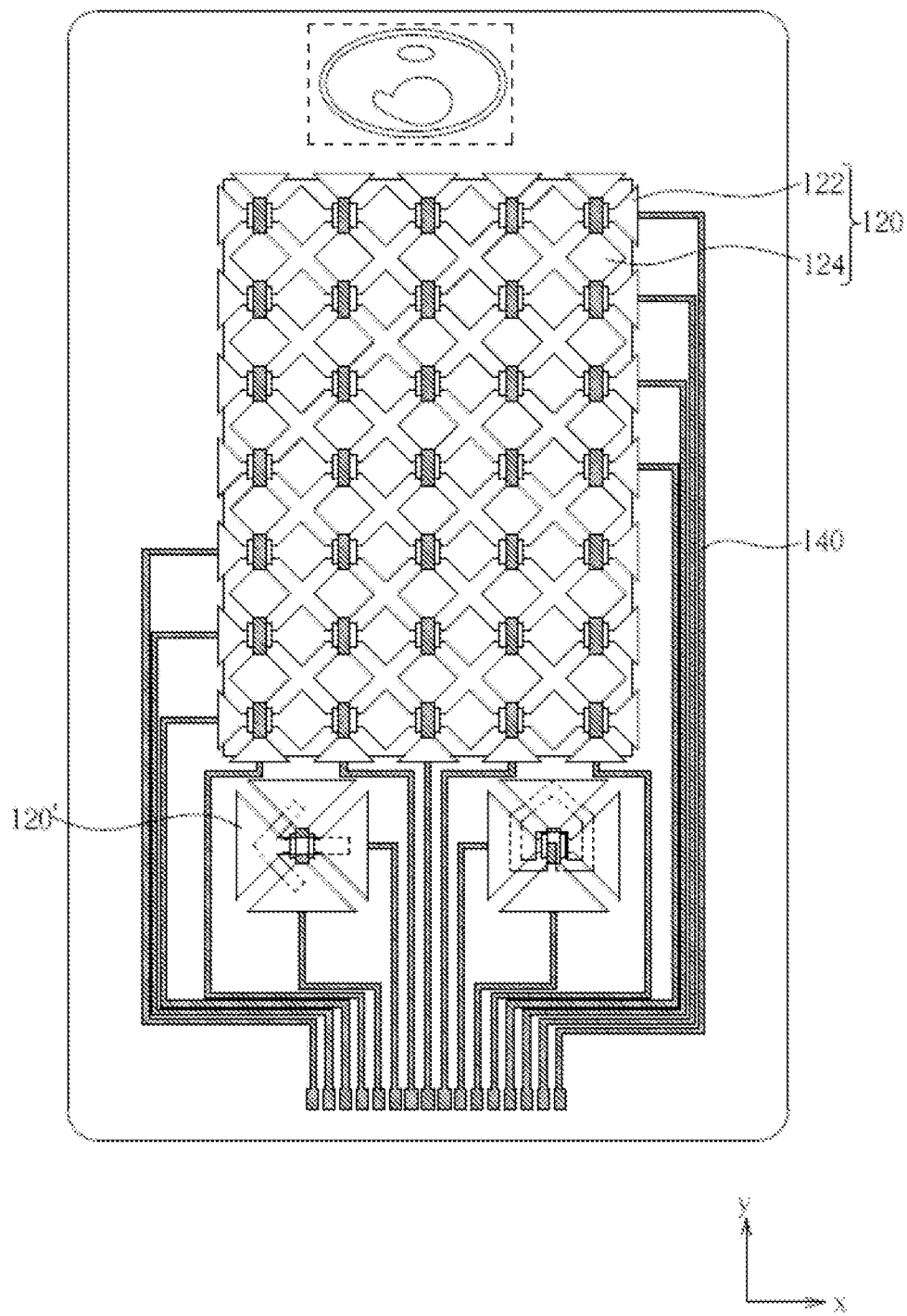
FIG. 8 shows top view of a touch panel in accordance with another embodiment of the present disclosure.

FIG. 8 illustrates a top view of the touch panel in accordance with another embodiment of the present disclosure. The embodiment is roughly similar to that of FIG. 1 and the difference lies in that the first electrode array 120 and the second electrode array 120' formed on the inductive electrode layer in accordance with the present embodiment are not electrically connected with each other. In other words, each of the first electrode array 120 and the second electrode array 120', whose respective first inducing lines 122 and second inducing lines 124 are electrically connected to the controlling unit in separate via the lead-wire structure 140, make the controlling unit independently correspond to the first electrode array 120 and the second electrode array 120' for driving and sensing controls and the acceleration of touch sensing scanning. Moreover, the embodiment can further design the second electrode array 120' as two groups for respectively corresponding to the piercing patterns of two button symbols. The configuration correlation of the actual first electrode array 120 and second electrode array 120' and the laminated structure are determined by the actual demand. However, it would be appreciated that this is not limited by the present disclosure.

In conclusion, a touch panel and a fabrication method is provided in the present disclosure, in which electrode arrays are designed correspondingly in both the display region and the peripheral region of the touch panel, and the symbols of virtual buttons and mark are further formed in the peripheral region via a patterned mask layer, thereby letting the display region and the peripheral region of the same touch panel surface have their respective touch response functions and letting the mentioned peripheral region possess the performance of displaying the symbols of marks. Therefore, the present disclosure is qualified with having the advantages of surface evenness and easy cleaning of touch panels. In addition, the electrode arrays, configured to realize various touch response functions, can be finished in the same step of manufacturing procedure, which renders the touch panel of the present disclosure to have more reliability and simplicity.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. A touch panel comprising:
    an upper cover substrate comprising a display region and a peripheral region, wherein the peripheral region surrounds the display region;
    a first electrode array disposed corresponding to the display region;
    a patterned mask layer disposed corresponding to the peripheral region;
    at least one second electrode array disposed corresponding to a first patterned region of the patterned mask layer; and
    a colorful film disposed corresponding to the patterned mask layer.

2. The touch panel of claim 1, wherein the first electrode array and the patterned mask layer are disposed on the upper cover substrate, and further wherein the second electrode array is disposed on the patterned mask layer.

3. The touch panel of claim 1, wherein the second electrode array is electrically connected to the first electrode array, wherein the second electrode array is an extending part of the first electrode array.

4. The touch panel of claim 1, wherein the patterned mask layer further comprises a second patterned region.

5. The touch panel of claim 4, wherein the first patterned region and the second patterned region respectively comprise a piercing pattern.

6. The touch panel of claim 1, wherein the first electrode array and the second electrode array are formed within a same inductive electrode layer.

7. The touch panel of claim 6, further comprising a passivation layer disposed between the inductive electrode layer and the colorful film.

8. The touch panel of claim 6, wherein the first electrode array and the second electrode array respectively comprise a plurality of first inducing lines aligned in parallel with a first axis and a plurality of second inducing lines aligned in parallel with a second axis, and wherein the first inducing lines and the second inducing lines are mutually insulated.

9. The touch panel of claim 8, wherein each of the first inducing lines comprises:
    a plurality of first conductive units belonged to a conductive layer of the inductive electrode layer and disposed mutually at intervals along the first axis; and
    a plurality of first conductive wires belonged to the conductive layer in electrical connection between two adjacent first conductive units along the first axis, wherein areas between the adjacent first inducing lines and surrounded by the adjacent first conductive units form a configuration region.

10. The touch panel of claim 9, wherein each of the second inducing lines comprises:
    a plurality of second conductive units belonged to the conductive layer and disposed within the configuration region respectively; and
    a plurality of second conductive wires belonged to a wiring layer of the inductive electrode layer and in electrical connection between two adjacent second conductive units along the second axis by correspondingly crossing the first conductive wires.

11. The touch panel of claim 10, wherein the inductive electrode layer further comprises a plurality of insulating blocks correspondingly disposed between the first conductive wires and the second conductive wires to make the first inducing lines and the second inducing lines electrically insulated.

12. The touch panel of claim 6, further comprising a lead-wire structure belonged to a wiring layer of the inductive electrode layer and disposed correspondingly to the peripheral region in electrical connection to the first electrode array and the second electrode array.

13. A manufacturing method of a touch panel comprising the steps of;
    forming a patterned mask layer for being disposed corresponding to a peripheral region of an upper cover substrate, wherein the peripheral region surrounds a display region of the upper cover substrate;
    forming a first electrode array and a second electrode array, wherein the first electrode array is disposed corresponding to the display region, and wherein the second electrode array is disposed corresponding to a first patterned region of the patterned mask layer; and
    forming a colorful film corresponding to the patterned mask layer.

14. The manufacturing method for the touch panel of claim 13, wherein the patterned mask layer and the first electrode array are disposed on the upper cover substrate, and wherein the second electrode array is disposed on the patterned mask layer.

15. The manufacturing method for the touch panel of claim 13, wherein the patterned mask layer further comprises a second patterned region.

16. The manufacturing method for the touch panel of claim 13, wherein the first electrode array and the second electrode array are formed within a same inductive electrode layer.

17. The manufacturing method for the touch panel of claim 16, further comprising:
    forming a passivation layer between the inductive electrode layer and the colorful film.

18. The manufacturing method for the touch panel of claim 16, wherein the step of forming the first electrode array and the second electrode array further comprises:
    coating a conductive layer;
    patterning the conductive layer to form a plurality of first inducing lines aligned in parallel with a first axis and a plurality of second conductive units, wherein each of the first inducing lines comprises a plurality of first conductive units and a plurality of first conductive wires, and wherein the first conductive units are disposed mutually at intervals along the first axis, while two adjacent first conductive units are electrically connected through the first conductive wires, and wherein areas between the adjacent first inducing lines and surrounded by the adjacent first conductive units form a configuration area, and further wherein the second conductive units are disposed on the configuration area;
    coating and patterning an insulating layer to form a plurality of insulating blocks corresponding to each of the first conductive wires; and
    coating and patterning a wiring layer to form a plurality of second conductive wires disposed correspondingly to each of the insulating blocks, wherein the second conductive wires are respectively in electrical connection between two adjacent second conductive units along a second axis to form a plurality of second inducing lines aligned in parallel with the second axis.

19. The manufacturing method for the touch panel of claim 18, wherein the step of coating and patterning the wiring layer further comprises forming a lead-wire structure disposed correspondingly to the peripheral region in electrical connection to the first electrode array and the second electrode array.

20. The manufacturing method for the touch panel of claim 13, wherein the colorful film is formed with colorful laminated films, is produced by printing colorful inks, colorful photoresistances or light-guiding inks, or is produced by spraying colorful inks, colorful photoresistances or light-guiding inks.

* * * * *